United States Patent

Ernst et al.

Patent Number: 5,082,189
Date of Patent: Jan. 21, 1992

[54] CHOPPER FOR COMMINUTING STALK-SHAPED HARVESTED CROPS

[75] Inventors: Klinger Ernst, Harsewinkel; Isfort Heinrich, Duelmen, both of Fed. Rep. of Germany

[73] Assignee: Class OHG, Harsewinkel, Fed. Rep. of Germany

[21] Appl. No.: 579,696

[22] Filed: Sep. 10, 1990

[30] Foreign Application Priority Data

Oct. 10, 1989 [DE] Fed. Rep. of Germany ....... 3933779

[51] Int. Cl.⁵ .............................................. B02C 18/22
[52] U.S. Cl. ................................. 241/158; 241/101.7; 241/222
[58] Field of Search ..................... 56/13.3, 14.5, 14.6, 56/13.8, 14.1; 241/101.7, 60, 158, 101 A, 222

[56] References Cited

FOREIGN PATENT DOCUMENTS

| | | |
|---|---|---|
| 0244892 | 11/1987 | European Pat. Off. |
| 1265481 | 4/1968 | Fed. Rep. of Germany. |
| 2061494 | 6/1971 | Fed. Rep. of Germany. |
| 3337381 | 4/1985 | Fed. Rep. of Germany. |
| 3415508 | 11/1985 | Fed. Rep. of Germany. |
| 3528638 | 2/1987 | Fed. Rep. of Germany. |
| 3538554 | 5/1987 | Fed. Rep. of Germany. |
| 3727156 | 2/1989 | Fed. Rep. of Germany. |
| 2285800 | 4/1976 | France .................. 56/13.3 |
| 2539950 | 8/1984 | France. |
| 2553254 | 4/1985 | France. |
| 2079574 | 1/1982 | United Kingdom. |

Primary Examiner—Mark Rosenbaum
Attorney, Agent, or Firm—Spencer & Frank

[57] ABSTRACT

In a chopper for comminuting stalk-shaped harvested crops, in particular maize, to improve the throughput it is proposed that the cutting drum (10), the press rollers (7) and the post-accelerator rotor (6) have the same width. Preferably, the post-accelerator rotor (6) is arranged directly above the press rollers (7) and, to be precise, in particular on the side on which it can have the same direction of rotation as the cutting drum (10).

4 Claims, 2 Drawing Sheets

CHOPPER FOR COMMINUTING STALK-SHAPED HARVESTED CROPS

BACKGROUND OF THE INVENTION

The invention relates to a chopper for comminuting stalk-shaped harvested crops, in particular maize, having a cutting drum, downstream of which are a pair of axially parallel press rollers (also known as cracker or conditioning rollers) and a post-accelerator rotor.

In the case of known field choppers, the post-accelerator rotor is, due to the design, considerably narrower, i.e. shorter in the axial direction, than the cutting drum and the press rollers. For this reason, the conveying channel tapers from the width of the press rollers to the considerably smaller width of the post-accelerator, which leads to conveying problems since the centrifugal action of the press rollers is limited despite high rotational speeds.

SUMMARY OF THE INVENTION

The object on which the invention is based is to improve the throughput of conveyed material without considerably increasing the power required.

This object is achieved according to the invention by the fact that the cutting drum, the press rollers and the post-accelerator rotor have the same width. As a result of this proposal, operating safety, in particular with the use of grass, is increased since the widening of the post-accelerator increases the sucking and blowing action.

In the case of those known choppers whose conveying shaft rises steeply after the press rollers, a further problem is encountered. Highly comminuted conveyed material is deposited on the inner walls of the steep conveying shaft and hardens. While the machine is working, this does not impair its performance since the layer which builds up is continually entrained and carried off by the conveying stream. However, on transporting the harvesting machine, for example from one field to another, the layers become detached, as a result of the vibration, and form a considerable accumulation on and above the press rollers (FIG. 1). On restarting the machine, this leads to a complete blockage of the conveying system.

It is therefore proposed in a further development of the invention that the post-accelerator rotor be arranged directly above the press rollers. The section of the conveying shaft to which parts of material may become attached during operation thus begins only above the post-accelerator. The rotor blades of the post-accelerator projecting into the conveying shaft catch the falling material and throw it outwards on restarting. A bridge formation and consequently complete obstruction above the press rollers is thus ruled out.

It is particularly advantageous if the post-accelerator rotor has the same direction of rotation as the cutting drum, so that their axes are both situated on the same side of the conveying channel. In this arrangement, the action of the post-accelerator is increased by the fact that the main conveying direction bends upwards, that is to say the conveying direction from the cutting drum to the post-accelerator rotor is less steep than after the rotor. At the same time, the rotor blades protect the press rollers better since they come close to the wall of the conveying shaft over a longer curved section. The post-accelerator may, however, also be fastened to the opposite side of the conveying shaft and run in the opposite direction of rotation to the cutting drum. In this case, the conveying direction preferably bends away from the cutting drum with less of an incline.

The greater the number of rotor blades, the better is the protective effect. If, however, with regard to an increased conveying capacity for example only four rotor blades are used, provision may be made using a catch mechanism or the like to stop the accelerator rotor, after switching off its drive, in an angular position in which at least one of its rotor blades completely blocks off the conveying shaft.

BRIEF DESCRIPTION OF THE DRAWING

A chopper of known design and an exemplary embodiment of the invention are elucidated below with reference to the drawing, wherein, specifically, FIG. 3 shows a corresponding enlarged representation of the cutting drum and the adjoining apparatus of the chopper according to FIG. 2, and FIG. 4 shows a schematic front view of the device according to FIG. 3.

DESCRIPTION OF THE PREFERRED EMBODIMENTS

Figure 1:
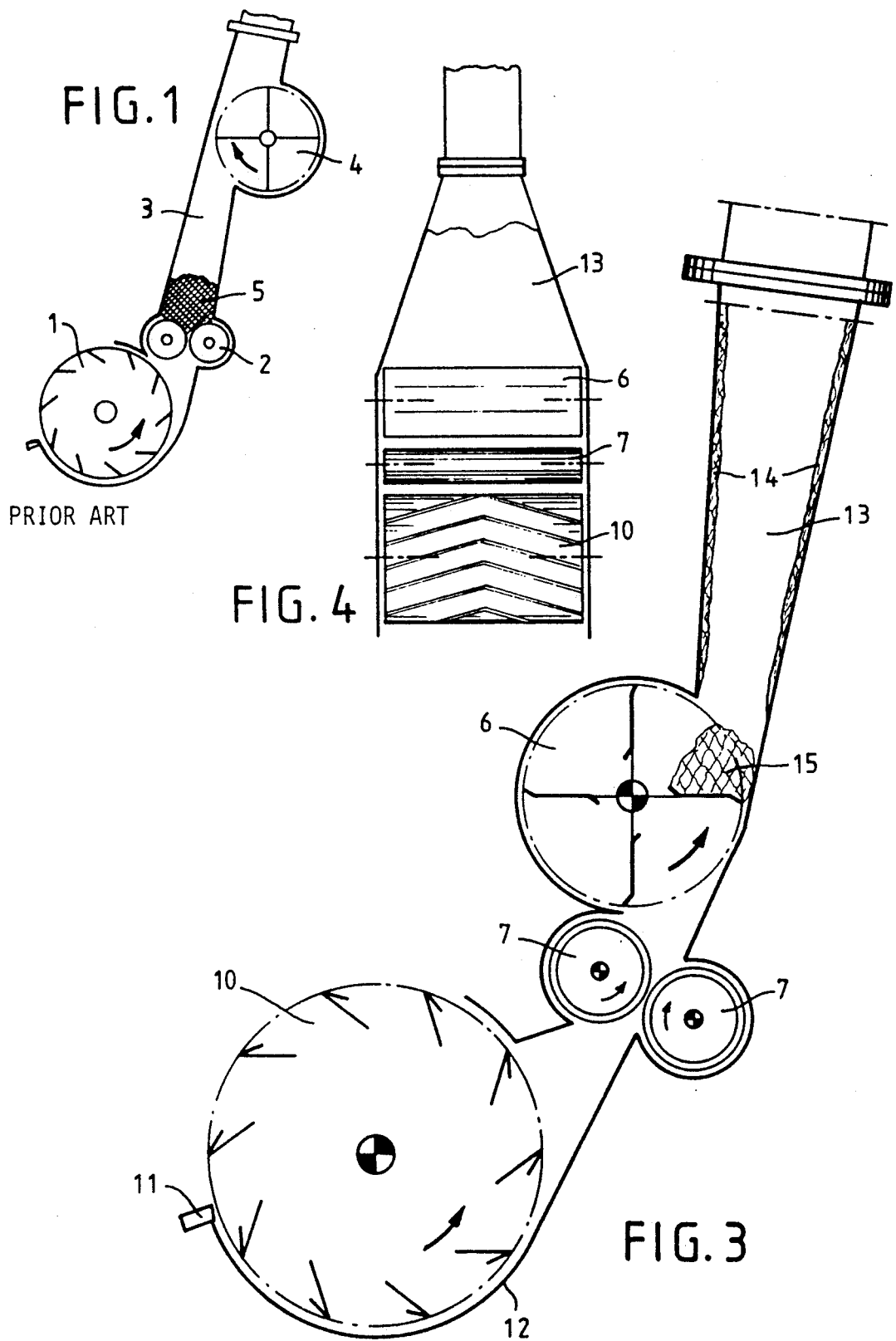
FIG. 1 shows a schematic side view of a known chopper.

The known chopper according to FIG. 1 has a cutting drum 1, which feeds the chopped material to a pair of press rollers 2. The latter projects the chopped material upwards in a relatively steep conveying shaft 3, where it is taken up by a post-accelerator rotor 4 and is further conveyed through an ejecting bend (not shown) adjoining the rotor at the top. This representation is intended to make clear how, on transporting this chopper, material adhering to the inner surfaces of the conveying shaft 3 can become detached and forms an accumulation 5 above the press rollers 2.

In contrast, according to the invention, the post-accelerator rotor 6 is arranged directly, i.e. as close as possible, above the press rollers 7 and it also has the same width as these. This is shown in particular by FIG. 4.

Figure 2:
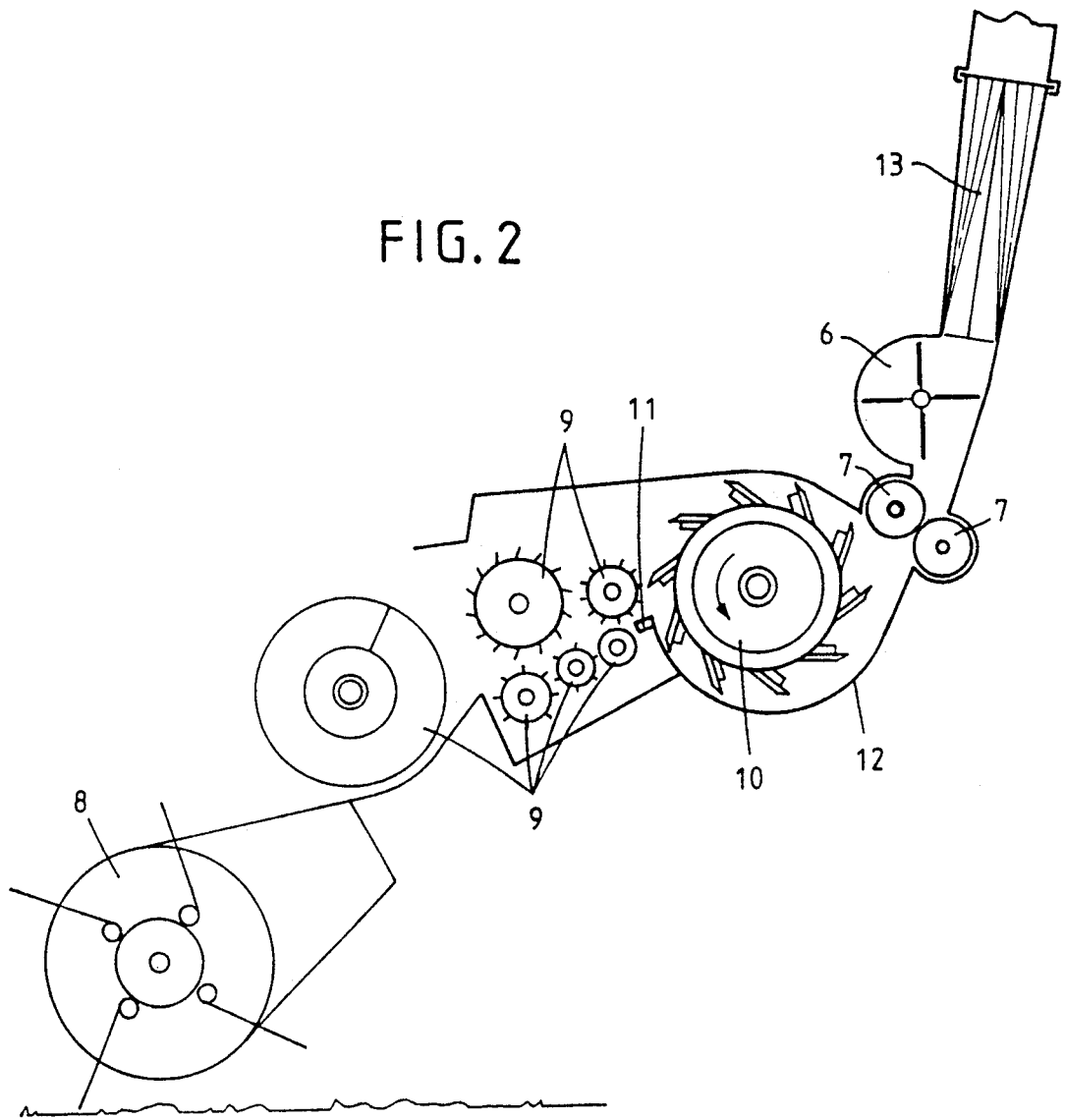
FIG. 2 shows a side view of a field chopper according to the invention with the associated devices for picking up and feeding the harvested crops.

In FIG. 2 the entire machine constructed in the form of a self-propelled field chopper is shown with its most important parts. Adjoining a front pronged pick-up drum 8 are various draw-in members 9 and a cutting drum 10. Preceding the latter is a counter cutting edge 11 which is fixed to the machine, and a housing 12.

From the cutting drum, the chopped material passes, at an angle of inclination of approximately 60° relative to the horizontal, to the inlet gap of the press rollers 7 and then on to the post-accelerator rotor 6. The axis of the latter runs almost perpendicularly above the axis of the left press roller 7. Adjoining the post-accelerator rotor 6 is a conveying shaft 13 whose central axis is considerably steeper, at an angle of approximately 80° relative to the horizontal. This conveying shaft 13 has a narrow rectangular cross-section at the bottom and changes into a square cross-section towards the top.

If fine adhering material 14 becomes detached from the inner wall of the conveying shaft 13 and falls downwards, an accumulation 15 is formed on at least one of the rotor blades of the post-accelerator rotor 6. However, this does not adversely affect the performance, since such strong centrifugal forces are produced on restarting the rotor that even accumulations which have already hardened are broken up and discharged.

We claim:

1. Chopper for comminuting stalk-shaped harvested crops comprising:
   a housing having walls defining a conveying passage, said conveying passage including a steeply rising, tapering conveyor shaft;
   a cutting drum rotatingly disposed in the housing for cutting harvested crops;
   a pair of axially parallel press rollers disposed downstream of the cutting drum in the housing for receiving chopped material fed from the cutting drum; and
   a post-accelerator rotor having a plurality of blades arranged adjacent to and directly above the press rollers in the conveying passage, the cutting drum, the press rollers and the post-accelerator rotor are of the same width, and the steeply rising conveyor shaft begins only above the post-accelerator rotor.

2. Chopper according to claim 1, wherein the post-accelerator rotor has the same direction of rotation as the cutting drum.

3. Chopper according to claim 1, wherein the direction of rotation of the post-accelerator rotor is opposite to that of the cutting drum.

4. Chopper according to claim 1, further comprising means for stopping the post-accelerator rotor, after switching off its drive, in an angular position in which at least one of its rotor blades blocks off the conveying shaft.

* * * * *

UNITED STATES PATENT AND TRADEMARK OFFICE
CERTIFICATE OF CORRECTION

PATENT NO. : 5,082,189

DATED : January 21st, 1992

INVENTOR(S) : Ernst KLINGER & Heinrich ISFORT

It is certified that error appears in the above-identified patent and that said Letters Patent is hereby corrected as shown below:

On the title page: Items 19, change "Ernst et al." to --Klinger et al.--.
75, change "Klinger Ernst" to --Ernst Klinger--, and change "Isfort Heinrich" to --Heinrich Isfort--.
73, change "Class" to --Claas--.

Signed and Sealed this

Eleventh Day of May, 1993

Attest:

MICHAEL K. KIRK

*Attesting Officer*     Acting Commissioner of Patents and Trademarks